June 8, 1926. 1,587,552
J. H. PRESS
VEHICLE BODY CONSTRUCTION
Filed Dec. 11, 1922 2 Sheets-Sheet 1
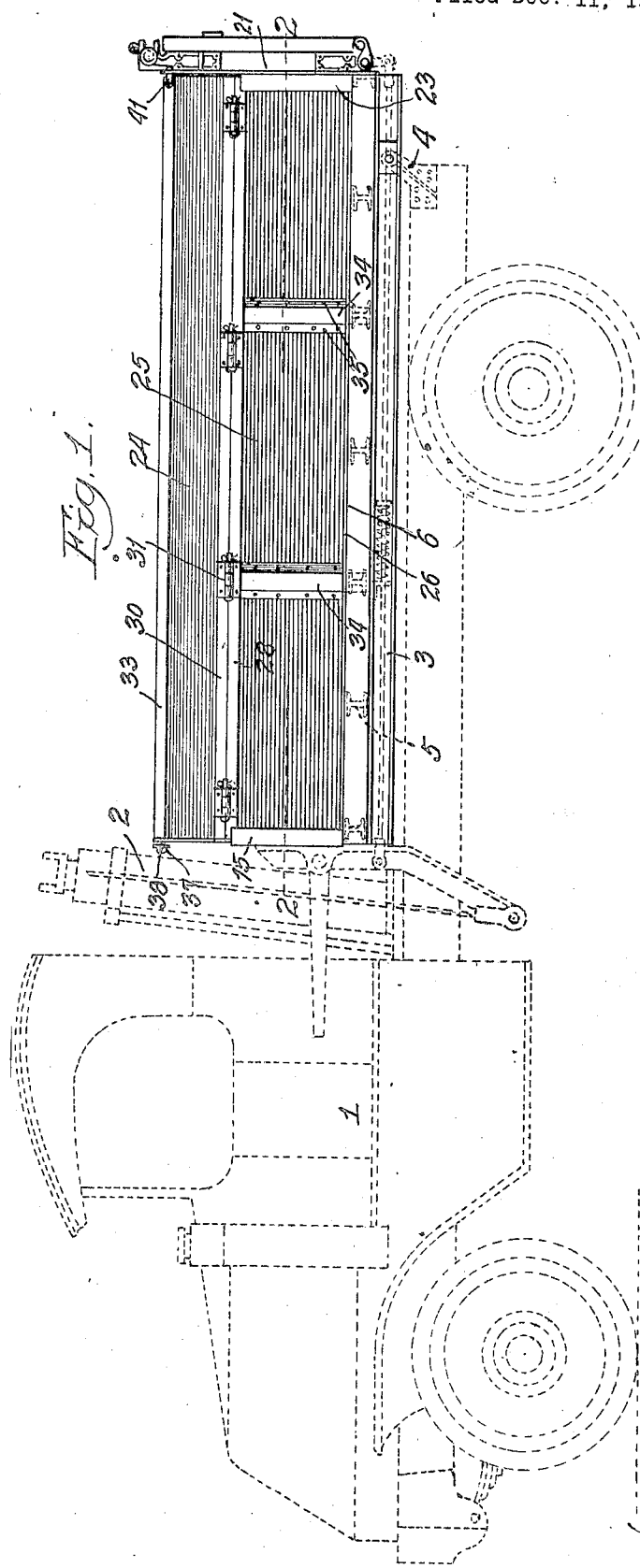
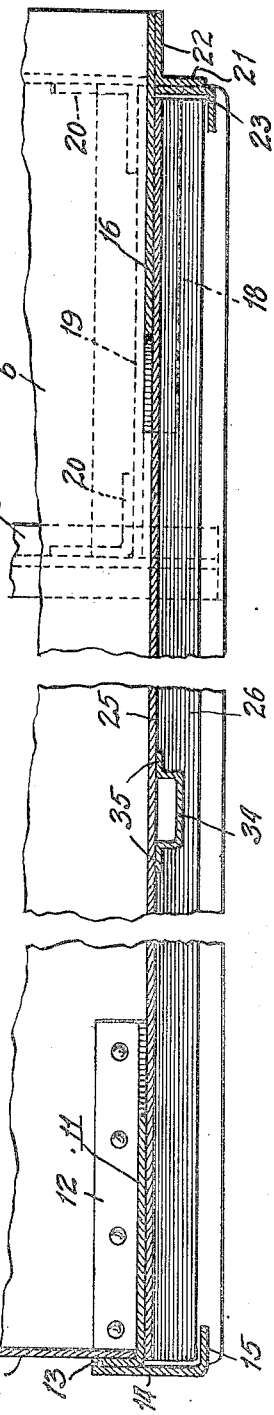
Inventor:
Jacob H. Press,
by Wallace R. Lane
Atty.

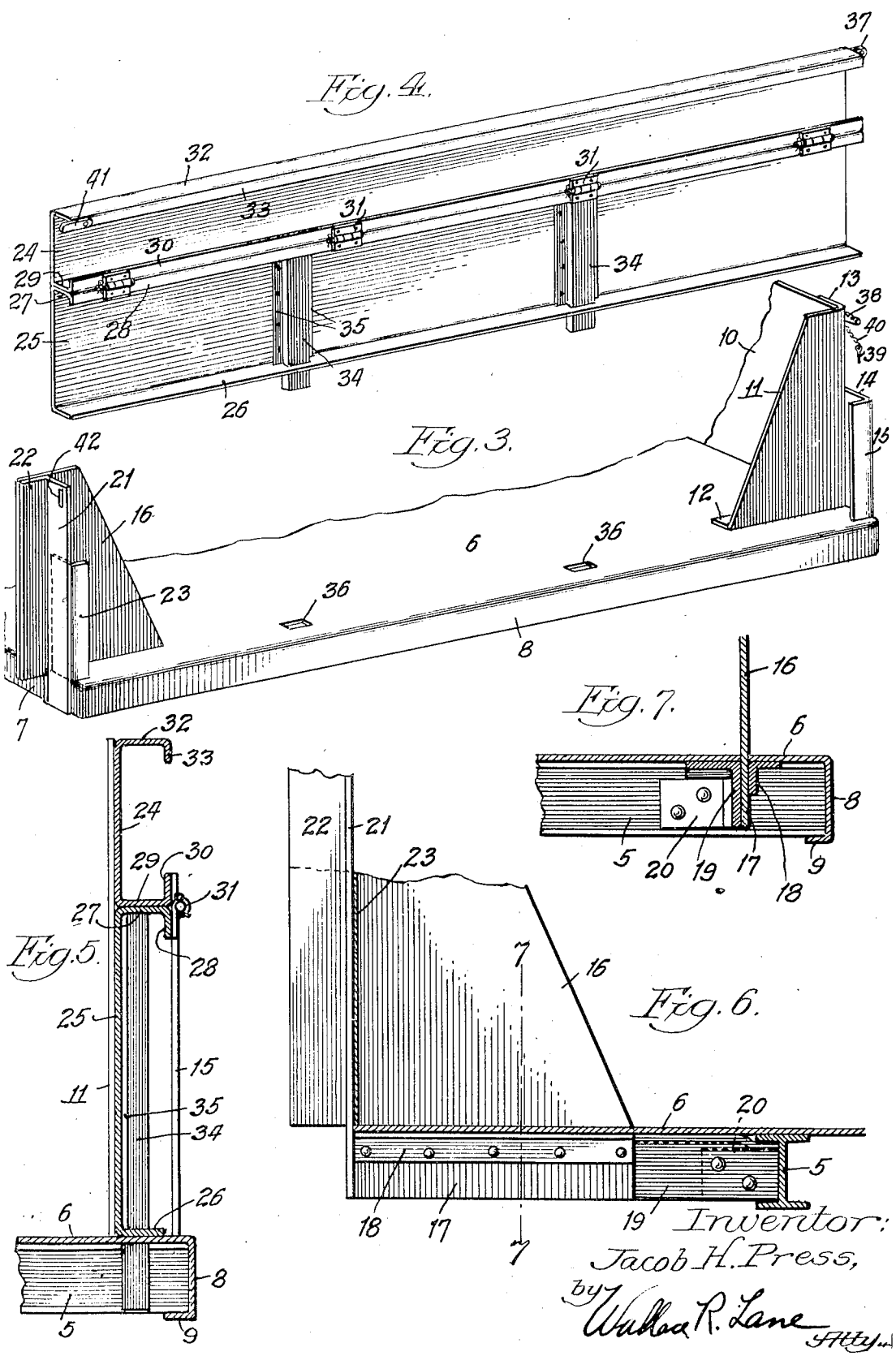

Patented June 8, 1926.

1,587,552

UNITED STATES PATENT OFFICE.

JACOB H. PRESS, OF CHICAGO, ILLINOIS, ASSIGNOR TO JACOB PRESS' SONS, OF CHICAGO, ILLINOIS.

VEHICLE BODY CONSTRUCTION.

Application filed December 11, 1922. Serial No. 606,020.

The present invention relates to body constructions adapted for use with vehicles such as trucks, cars, scows, and similar conveyable apparatus, and is particularly illustrated in connection with a motor truck having dumping mechanism.

Among the objects of this invention is, to provide a flexibly constructed body of selected parts, standard in production, which when assembled produce a body of given capacity, whether small, medium or large; a body adapted to use, as desired, steel, wooden or other forms of sides, with or without hinged sections or extensions; a body with end gussets of standard lengths and which may be cut down to given or desired length or height to fit the given or selected size of body or height of sides; a body with fending or bumper portions capable of protecting the sides of the body against injury or destruction; a body with a bottom member having bracing uprights or end gussets secured, preferably at the lower end portions thereof, to the bottom member; with the uprights or gussets extending below the bottom member, preferably through perforations or slots provided in the bottom member, and securing the lower extending portions of the uprights by suitable means, such as bracing or anchoring members, to the bottom member, preferably to the under side thereof; to provide for lateral bracing of the gussets by use of props or posts connected to the gussets and the bottom member, and also so spacing them from the uprights or gussets to provide spaces or pockets therebetween for the reception of a side wall; to provide a side wall which may have extensions preferably hinged together, and means for locking the hinged portions in extended positions; to provide the side walls with stakes extending through perforations provided in the bottom member, to aid in bracing the side wall; to provide anchoring means for the uprights; to provide the anchoring means with thrust means cooperating with one of the cross members supporting the bottom member for the purpose of bracing the portion of the bottom member overhanging the supporting member whereby the load stresses tending to bend or flex such bottom member will be resisted by the bracing anchor member, the latter acting as a cantilever in thrust engagement with the cross supporting member; and such further objects, advantages and capabilities as will later more fully appear and are inherently possessed by the invention.

In the drawings illustrating the preferred form of the invention, Fig. 1 is a view in side elevation of the invention on a motor truck shown in dotted lines; Fig. 2 is a fragmentary sectional view taken on line 2—2 of Fig. 1; Fig. 3 is a fragmentary perspective view of a side of the body with the side wall removed; Fig. 4 is a perspective view of the side wall adapted to fit in the side shown in Fig. 3; Fig. 5 is a transverse sectional view of a side of the body; Fig. 6 is a fragmentary view, partly in elevation and partly in section, of a stay portion of the body, and Fig. 7 is a fragmentary transverse sectional view taken on line 7—7 of Fig. 6.

Referring more specifically to the drawings, the invention is shown as mounted upon a motor truck 1, having thereon a hoisting or dumping mechanism 2, connected to longitudinally disposed supporting I-beams pivotally connected to the rear end of a truck upon the pivot plate 4. Upon the longitudinal beams 3 are supported and secured a plurality of I-beams 5 suitably spaced from each other, as clearly shown in Fig. 1 of the drawings. The transverse supporting members, or beams 5, may be secured to the beams 3 in a suitable manner such as by riveting, bolting or spot welding. Upon the cross members 5 is supported the bottom member 6 preferably of sheet metal and having at its ends and sides depending flanges 7 and 8, the flanges 8 contacting against the ends of the cross members 5 and also having inwardly bent flanges 9 engaging with the lower flanges of the cross beams 5. The ends of the I-beams 5 together with the flanges 8 and 9 extending laterally beyond the side walls of the body to form fenders or bumpers, the side walls being located within the outer boundaries of the fenders so that when the fenders hit against objects, the latter will not contact with the side wall. At the forward end of the body is connected an end wall 10, preferably of sheet metal and resting upon the forward end portion of the bottom 6. For the purpose of holding the end wall member 10 in upright position pair of upright members or gussets 11 are connected to the bottom member 6 near the forward corners of the latter. Each upright member 11 comprises a vertical body portion of substantially triangular form with the widest portion at the lower end, and provided at the lower end with a laterally extending flange 12, secured to the bottom member 6 by any suitable means, such as bolts, rivets or by spot welding. At the forward edge of the member 11 is integrally formed a laterally extending flange 13, which is secured to the end of the end wall 10 by any suitable means, such as rivets, bolts or by spot welding. In this way the end wall or gate 10 and the uprights 11 are permanently secured in place and to the bottom member 6. The upright or gusset 11 may, if desired, pass through the bottom 6 and be secured to it in the same manner as the gussets at the other end of the body are secured, as more fully hereinafter described. The gussets 11 are made of standard lengths, in production, and then cut off to the desired height, dependent upon the height of side wall to be used. To the flange 13 of each member 11 is suitably fastened, as by rivets, bolts or by spot welding, an L-shaped angle iron 14, having a flange 15 thereof located at the corner of the bottom member 6 and spaced from the body portion of the member 11, so as to provide between the member 11 and the flange 15 a channel, pocket or space into which an end of the side wall is capable of slidably fitting, as will more fully hereinafter appear. The angle member or post 14 is of shorter height than the member 11 and may rest with its lower end upon the bottom member 6, or, if desired, the lower end of the post may be secured to the bottom member 6 by spot welding or other suitable way.

At the rear end of the bottom member 6, the latter is provided with longitudinal slots through which extends the lower portion of upright stay members or gussets 16, the latter being substantially of triangular form, having its wider portion at the lower end and extending downwardly through the slots provided in the bottom member 6. These upright or gusset members 16 also are made of standard lengths, in production, and then cut off to the desired height, dependent upon the height of side wall to be used. The lower end portion 17 of the member 16 is anchored to the bottom member 6 by a pair of angle members 18 and 19, one flange of the angle member 18 being secured to the under face of the bottom member 6 in any suitable manner, as by rivets, bolts or by spot welding, and the other flange of the member 18 is similarly secured to the lower extending portion 17 of the member 16. The member 19 is disposed on the opposite side of the portion 17 from that upon which the member 18 is located, and has one of its flanges secured, as by rivets, bolts or by spot welding, to the under face of the bottom member 6, and has its other flange similarly secured to the side of the lower extending portion 17, as clearly shown in Fig. 7 of the drawings. The members 18 and 19 act as bracing or cantilever elements to support the bottom 6, as well as to anchor the member 16, any tendency of the member 16 to be laterally moved or in a longitudinal direction with respect to the length of the body will prevent the member 16 from being detached from the body member. Were the upright member 16 provided with a base flange secured to the upper face of the bottom 6 it will be apparent that any great force acting horizontally against the member 16 so as to tend to lift the lower portion thereof from the bottom 6, would tend to rip the bottom portion thereof from such bottom member. By having the member 16 extend through the bottom member and securely anchoring it with members connected to the under faces of bottom member and to both sides of the lower extending portion 17 of the upright member 16, it will now be apparent that a more efficient anchoring of the member 16 is effected.

The member 19 is made longer than the member 18 and extends to and comes in contact with a side of the web portion of a cross beam 5, as clearly shown in Fig. 6 of the drawing. For the purpose of holding the inner ends of the member 19 in contact with the web portion of the beam 5 a foot or angle member 20 is secured both to the end portion of member 19 and to the web portion of the beam 5, as clearly shown in Figs. 6 and 7 of the drawing, the member 20 being so secured by rivets, bolts or by spot welding as desired. From this construction it will be noted that any vertical stress, due to the weight of the material contained in the body, tending to bend downwardly the portion of the bottom member 6 extending outwardly beyond the beam 5 will be readily resisted by the member 19, since the latter would tend to move toward the web portion of the beam 5, but inasmuch as it is already in thrust bearing therewith, it will act as a cantilever to sustain the load imposed upon the overhanging portion of the bottom 6. In this way the bottom 6 is prevented from bending or flexing under heavy loads, and has its supporting efficiency greatly increased.

The member 16 is further laterally braced by vertically disposed angle member 21 having one of its flanges 22 secured to an outwardly extending marginal portion on the member 16 in any suitable manner, as by riveting, bolting or spot welding, as desired. The other flange of the upright member 21 extends downwardly below the top surface of the bottom member 6 and is securely fastened to the end flange 7, as clearly shown in Figs. 3 and 6 of the drawings. To this flange of the member 21 is also secured, as by rivets, bolts or spot welding, a prop, post or upright member 23 corresponding to the post 15 at the other end of the body member. The member 23 having one of its flanges secured to the flange of the member 21 and having its other flange located in spaced relation with the body portion of the member 16 so as to form therebetween a channel or pocket in which the other end of a side wall might be received, as will more fully hereinafter appear. The lower end of the member 23 may rest upon the upper surface of the bottom member 6 or may be rigidly secured thereto, as by spot welding, etc., as desired. It will be understood that at the opposite corner of the bottom 6 at the rear end of the same, is secured a similar device.

It also will be understood that the gusset and anchoring structure, comprising members 16, 21, 23, 18, 19 and 20 and the anchoring may be adopted or duplicated at the other end of the body in lieu of the upright or gusset structure comprising members 11, 12, 14 and 15, whereby the advantage of the stronger structure may be had, the showing of the gusset and anchoring structure at one end of the body being merely illustrative and not preventing the use of the said structure at the other end of the body.

The sides to the body member are preferably removable and may be single integrally formed rigid members, or hinged sections forming extended or expanded side members of selected height in accordance with the capacity the body is to have. The sides also may be of any kind of material, such as wood, sheet steel, fiber and other and similar substances, but are preferably of sheet steel and composed of hinged sections each comprising a pair of channel shaped sections 24 and 25, the section 25 forming the main or wall portion of the side and the section 24 forming the expanding or height extending section. The lower section 25 of the side wall has a lower flange 26 adapted to rest upon the top surface of the bottom member 6, near the side edges thereof. At the upper part of the section 25 is formed a laterally extending flange 27 having a depending flange portion 28, and the lower part of the section 24 is similarly formed with a laterally extending flange 29, having an upwardly extending flange portion 30. The upper section 24 normally rests upon the lower section 25 by the flange 29 resting upon the flange 27, as clearly shown in Figs. 4 and 5 of the drawings. To the flange portions 28 and 30 are secured one or more hinge members 31, so that the upper section 24 may be swung downwardly about the axes of the hinges as desired, thus reducing the height of the side member for any one of various purposes, such as when it is desired to make it easier to shovel material into the body without necessitating raising the shovels to an unnecessary height. At the upper part of the section 24 is also formed laterally extending flange 32 provided with a depending flange portion 33, giving strength to the section 24.

There is also secured to the side of the sections 25 between the flanges 26 and 27, at suitable spaced distances, channel shaped members or pressed steel stakes 34, having side flanges 35 by which the members 34 may be suitably secured to the side wall of the sections 25, as by rivets, bolts or spot welding. The lower ends or stake tenons of the members 34 preferably extend through suitable apertures formed in the lower flange 26 and into apertures or stake pockets 36 provided in the bottom member 6, as clearly shown in Fig. 3 of the drawings. It will be noted that the members 34 act as stakes and the lower end portions extend into the holes 36, for laterally bracing the sections 25 in aid of the bracing action it receives from the members 11 and 16 and the posts 15 and 23, as described above.

At the forward end of the flange member 32 is secured an eye member 37 adapted to pass over a locking bolt 38, suitably fastened or fixed to the flange 13 of the upright member 11, as clearly shown in Figs. 3 and 4 of the drawings. When the upper section 24 is raised to extend the height of the side wall, the eye 37 will pass over the end of the bolt 38, and the cotter pin 39 may be inserted in a suitable aperture provided in the bolt 38 for holding the section 24 in locked and upright position. The cotter pin 39 may be connected to the bolt 38 or the flange 13 in any suitable manner, as by means of a chain 40. At the other end of the flange member 32 is pivotally connected a locking tongue 41, adapted, when the upper section 24 is in raised position, to swing into a slot 42 provided in the upper end of a flange of the member 21, as clearly shown in Fig. 3 of the drawings. In this way the tongue 41 co-acts with the slot 42 to prevent the outward swinging of the section 24. It will of course be understood that there are two side walls, one on each side of the body of the truck, and that the construction of the wall on the opposite side from that above described is the same as that applied to the side shown in Figs. 3 and 4 of the drawings.

When placing the side walls in position the same is lifted so that it may be able to slide vertically downwardly into the pockets or spaces provided between the flanges of the posts 15 and 23 and the body portions of the uprights 11 and 16, the ends of the side walls sliding thereinto. It will be noted, however, that the posts 15 and 23 extend upwardly to a height slightly less than the height of the section 25, so that the upper section 24 will not be hindered in its hinging movement when it is desired to swing it outwardly and downwardly to lower the height of the side wall.

It will also be noted that the side 8 of the bottom or flooring 6 of the body extends out beyond the outer vertical plane of the side wall so that the side 8 will act as a fender or bumper for preventing the contact of any of the parts of the side wall with relatively stationary objects, such as posts, poles, building walls or corners, wharves, piling and all like and similar objects apt to be hit by the sides 8 of the body.

While I have herein described and upon the drawings shown a specific embodiment of my invention, it is to be understood that the invention is not limited to the particular construction, details and arrangements of parts shown and described, but that other constructions, details and arrangements of parts are comprehended by the invention without departing from the spirit thereof.

Having now described my invention, I claim:—

1. In a body construction adapted for use with a vehicle, a bottom member provided with a slot, a stay member having a lower portion thereof extending downwardly through said slot and below said bottom member, an upright post engaging the bottom member and secured to said stay member, and a side wall connected between the stay member and the post.

2. In a body construction adapted for use with a vehicle, a bottom member, stays secured at the lower ends thereof to the bottom member, posts of shorter lengths than said stays secured to the stays and having portions thereof in spaced relation to the stays, and a side wall resting on the bottom member and fitting in the space between the stays and said portions of the posts, said side wall having a hinged portion capable of swinging on an axis above the posts.

3. In a body construction adapted for use with a vehicle, a bottom member provided with apertures, stays extending downwardly through said apertures, anchoring members fastened to the downwardly extending portions of the stays and the under side of the bottom member, posts secured to the stays and having portions thereof spaced from the stays, and a side wall fitting in the space between the stays and said post portions.

4. In a body construction adapted for use with a vehicle, a bottom member, supporting members for the bottom member, uprights extending downwardly through the bottom member, anchor members fastened to both sides of each downwardly extending portion of the uprights and to the under side of the bottom member, one of said anchor members extending into thrust engagement with a supporting member for more effectively supporting the bottom member.

In witness whereof, I hereunto subscribe my name to this specification.

JACOB H. PRESS.